US007130983B1

(12) United States Patent
DeTar, Jr. et al.

(10) Patent No.: US 7,130,983 B1
(45) Date of Patent: *Oct. 31, 2006

(54) SYSTEM AND METHOD FOR REFERENCE COUNT REGENERATION

(75) Inventors: George Franklin DeTar, Jr., Longmont, CO (US); John Timothy O'Brien, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 485 days.

This patent is subject to a terminal disclaimer.

(21) Appl. No.: 10/738,946

(22) Filed: Dec. 17, 2003

(51) Int. Cl.
G06F 12/06 (2006.01)
(52) U.S. Cl. .................................................. 711/210
(58) Field of Classification Search ................ 711/210
See application file for complete search history.

(56) References Cited

U.S. PATENT DOCUMENTS

| | | | |
|---|---|---|---|
| 4,400,770 A * | 8/1983 | Chan et al. ..................... 711/3 |
| 4,695,949 A * | 9/1987 | Thatte et al. ............... 707/206 |
| 4,985,829 A | 1/1991 | Thatte et al. |
| 5,043,885 A * | 8/1991 | Robinson .................... 711/133 |
| 5,410,667 A * | 4/1995 | Belsan et al. ............... 711/114 |
| 5,619,675 A | 4/1997 | De Martine et al. |
| 5,668,968 A * | 9/1997 | Wu ................................. 711/3 |
| 5,930,833 A * | 7/1999 | Yoshioka et al. ........... 711/210 |
| 6,038,639 A * | 3/2000 | O'Brien et al. ............. 711/114 |
| 6,061,774 A * | 5/2000 | Witek .......................... 711/210 |
| 6,067,608 A | 5/2000 | Perry |
| 6,421,767 B1* | 7/2002 | Mililo et al. ................ 711/162 |
| 6,779,094 B1* | 8/2004 | Selkirk et al. .............. 711/165 |
| 2003/0221076 A1* | 11/2003 | Milligan ...................... 711/165 |

OTHER PUBLICATIONS

Knuth, Donald E., "The Art Of Computer Programming", book. pp. 170-179, vol. 3, Addison-Wesley Publishing Company, U.S.
McIlroy, Peter M. and Bostic, Keith, "Engineering Radix Sort", journal, Winter 1993, pp. 4-27, vol. 6, No. 1, The University of California Press, Berkeley, California.
Specification, "System And Method For Reference Count Regeneration".

\* cited by examiner

Primary Examiner—Donald Sparks
Assistant Examiner—Jesse Diller
(74) Attorney, Agent, or Firm—Brooks Kushman P.C.

(57) ABSTRACT

In a disk-based data storage system, a controller configured to control a reference count regeneration operation, the controller includes a control register, an address register, a status register, a boundary register, and an embedded memory. The control register may be configured to set up and initiate program instructions that are executed by at least one processor. The address register may be configured as a cache address pointer and correspond to at least one of a sort output list pointer, a virtual track table input list pointer, a reference list pointer, a track number table pointer, and a reference count mis-compare list pointer. The status register may be configured to indicate status of a routine. The routine includes at least one of a radix sort, a reference list count, a combine counts, and a merger of the reference list count into the TNT to generate an updated TNT. The boundary register corresponds to a disk cache memory that may be configured to store at least one of a reference list, a reference list count length, and a mis-compare list. The embedded memory may be configured to perform at least one buffer operation in connection with the routine.

20 Claims, 4 Drawing Sheets

SYSTEM AND METHOD FOR REFERENCE COUNT REGENERATION

BACKGROUND OF THE INVENTION

1. Field of the Invention

The present invention relates to a system and a method for storage system reference count regeneration.

2. Background Art

Many conventional data processing systems provide for multiple references (i.e., a set of references) to a single instance of an object. Each of the references to the object is a pointer that identifies a physical storage location containing the object instance. Each reference has a unique name. The set of references to an object provides for a "many-to-one" mapping from a name space of reference names to a name space of physical storage locations. Typically, the amount of storage occupied by a reference to an object is much less that the amount of storage occupied by the object.

There are several benefits to implementing references that point to a common instance of an object rather than making multiple copies of the object. One of the benefits is that when N is a value greater than one, less storage is required to hold N references to an object and one instance of the object than is required to hold N copies of the object. Another benefit is that copying a pointer value from one reference to another reference can be done more quickly than making a complete copy of the object itself.

In some applications, a user may desire that updates to the contents of the object that are made through one reference are visible when the object is accessed through other references. In the case where updates are visible when the object is accessed through multiple references, employing multiple references to a common instance of an object saves time that would otherwise be required to update many copies of the referenced object. In other applications, the multiple references to an object can provide copy semantics. Copy semantics provide for accesses to the object that yield the same results as if a separate copy of the object had been made. In the case of copy semantics applications, a copy-on-write technique can be used to delay the process of making a separate physical copy of an object until a write that updates the object is performed. The copy-on-write technique for maintaining copy semantics when there are multiple references to an object is well known in the data processing art.

A common characteristic of conventional systems that provide one instance of an object to be accessed through multiple references is that the systems must maintain a count of the number of references to each object. When the reference count is zero (i.e., there are no references remaining that point to the associated object instance), the storage occupied by the object can be used for other purposes. In applications that maintain copy semantics, modifying the data content of an object that has a reference count greater than one triggers a process for making a copy of the object. A copy of the object is generated and the modification is applied to the copy of the object so that accesses made through the other references to the object access the original contents of the object.

U.S. Pat. No. 6,038,639 issued to John T. O'Brien, et al. (the '639 patent) discloses a dynamically mapped virtual data storage subsystem that uses a snapshot copy process to provide data file copy semantics by manipulating the pointer values contained in data file references. In the data storage subsystem disclosed in the '639 patent, a data file is referred to as a virtual track and each virtual track is identified by a unique virtual track address. The data content of a virtual track is stored on one or more physical disk drives.

The '639 patent discloses the use of a two level mapping table that maps a virtual track address to the physical storage location on disk at which the current data content of the virtual track is stored. A first phase of the process of mapping a virtual track address (i.e., the identity of the data file to be accessed) to the physical storage location at which the virtual track is stored implements a virtual track table (VTT). The VTT contains one entry for each virtual track address. The contents of the VTT entry selected by a particular virtual track address is an immutable name that uniquely identifies the object to be accessed. In the data storage subsystem of the '639 patent, the object to be accessed is a virtual track. The immutable name that uniquely identifies the virtual track address to be accessed is referred to as a track number.

A track number table (TNT) is implemented in a second phase of the process of mapping a particular virtual track address to the physical location at which the current virtual track instance for that virtual track address is stored. Each entry in the TNT contains a respective physical storage address of a virtual track instance and a reference counter for the virtual track. There is one entry in the TNT for each track number that appears in the VTT.

In the data storage subsystem disclosed in the '639 patent, a snapshot copy of a virtual track is made by copying a track number value from one entry in the VTT to another entry in the VTT. The process of generating a snapshot copy increases the reference count value stored in the TNT entry selected by the track number that was copied. After the snapshot copy operation is completed, two virtual track addresses are mapped to the same track number by the VTT. For example, when the track number value X stored in the VTT entry selected by virtual track address A is copied into the VTT entry selected by virtual track address B via a snapshot copy operation, an access to the data file selected by either virtual track address A or virtual track addresses B will cause the data storage subsystem to access the same virtual track instance on the physical disk. Because both of the VTT entries selected by the two virtual track addresses contain the same track number, i.e., X, a host computer attached to the data storage subsystem will perform as if the data file at virtual track address A has been copied to virtual track address B even though there is only one copy of the virtual track stored on the physical disk drives.

When the host computer writes to the virtual track at virtual track addresses A, the data storage subsystem uses the VTT to map virtual track address A to track number X and then reads the reference count stored in the TNT entry selected by track number X. Because the reference count is two, the data storage subsystem does not overwrite the virtual track instance identified by track number X. Instead, the data storage system stores the updated virtual track instance at a different location on the physical disks and assigns a new track number, i.e., Y, to represent the new virtual track instance. The new track number is stored in the VTT entry selected by virtual track address A. The VTT entry selected by virtual track address B still contains track number X.

Because one reference to track number X has been removed from the VTT, the data storage subsystem decrements the reference count for track number X, resulting in a reference count of one. When the host writes to the data file selected by virtual track address B, the data storage subsystem will not assign a new track number because only one reference to track number X remains. When updating a virtual track that is selected by a track number with a reference count of one, the previous data content of the virtual track instance is not preserved.

When the host computer instructs the data storage subsystem to delete the data content of the virtual track at virtual track address B, the data storage subsystem replaces the track number, X, stored in the VTT entry selected by virtual track address B with a null track number value. The null value indicates that the virtual track has been deleted. Deletion of the virtual track reduces the number of references to track number X and the data storage subsystem decrements the reference count field in the TNT entry selected by track number X. In the example described above, the resulting reference count value is zero. The zero value indicates that track number X is currently unused. The track number X is available to be selected as a new track number representing a newly written or modified virtual track. In the example described above, the track number Y is selected by the data storage subsystem. The track number Y is selected since the reference count value stored in the TNT entry selected by the track number Y contained zero at the time the host wrote to virtual track address A.

Thus, in the data storage subsystem of the '639 patent, the VTT entries serve as references to objects. The objects are TNT entries, each of which is identified by the respective track number. The many-to-one mapping of virtual track addresses to track numbers generates a need to maintain a reference count for each track number such that determination of when a track number is no longer used and when assignment of a new track number as part of a copy-on-write operation are necessary can be made.

The process of copying a track number from one VTT entry to another VTT entry and updating the reference count of the track number requires several separate steps. Between any two of the steps, the data storage subsystem may abruptly stop operation due to any of a loss of power, a hardware component failure, a software failure, and the like. Following such a failure, the data storage subsystem must recover the mapping table so that translation of the virtual track addresses into physical storage locations can continue.

An integral part of the mapping table recovery process is the regeneration of the reference count fields in the TNT entries. The reference counts are regenerated to ensure that the reference count values in the recovered mapping table correctly represent the number of references to each track number that resides in the VTT, even when the disk storage subsystem was in the process of changing the number of references at the time of the failure. The data storage subsystem regenerates the track number reference counts by scanning the VTT for valid track numbers, tabulating the number of occurrences of each track number, and updating the respective reference count field in each TNT entry.

To provide service for the host computers, a very large number of virtual tracks, on the order of millions or even billions of virtual tracks are desirably stored on the data storage subsystem. Storing a large number of virtual tracks provides the host computers access to a large amount of data. As a consequence, however, the mapping table contains a very large number of VTT entries and a very large number of TNT entries.

The amount of time required for the data storage subsystem to regenerate the reference counts determines a significant amount of the time that is taken for the data subsystem to recover the mapping table following a failure. The mapping table recovery time, in turn, determines the amount of time that the host computers wait to access data following a failure within the data storage subsystem. Increasing the amount of data that is stored by the data storage subsystem increases the size of the mapping table, which, in turn, lengthens the time that the host computers are prevented from accessing the stored data following a disk subsystem failure.

Alternatively, given a particular maximum acceptable failure recovery time, the time required to regenerate the reference counts ultimately dictates the maximum amount of data that can be stored in the data storage subsystem. What is needed is a system and method wherein the data storage subsystem can rapidly regenerate the reference counts in the mapping table. Such a system and method would yield the benefits of reduced failure recovery time and increased virtual data capacity of the subsystem. Such benefits generally increase the value of the data storage subsystem to the user.

Conventional approaches to reference count regeneration typically require the processors within the data storage subsystem to read the track number field from each VTT entry, tally the number of references to each track number, and merge the resulting reference counts into the TNT entries. Such conventional approaches encounter fundamental limitations that constrain the rate at which the reference counts can be regenerated.

The first of the limitations is the rate at which the mapping table contents (the VTT entries and the TNT entries) can be transferred over the control bus that connects the processors to the disk cache memory where the mapping table is stored. The control bus transfer rate limitation can be addressed by increasing the rate at which data can be transferred over the control bus. However, increasing the data transfer rate is undesirable due to the development effort required whenever increases in the size of the mapping necessitate an increase in the control bus bandwidth. Increasing the speed of the control bus requires a new design for the processor card (which is at one end of the control bus) and a new design for the cache interface card (at the other end of the control bus). Increasing the data transfer rate is also undesirable from a product cost perspective because higher speed data transfer devices and interconnects are typically more expensive than lower speed implementations.

The second limitation is due to the size of the random-access memory (RAM) that is directly attached to each processor. The RAM is used to hold the tallied reference counts. Processor memory is implemented as the reference count RAM rather than disk cache memory because processor memory is designed to efficiently process random access patterns whereas disk cache memory is optimized for sequential access patterns. After many snapshot copy operations and many host writes that lead to the assignment of new track numbers, the arrangement of track numbers in the VTT may become highly scrambled (i.e., highly randomized).

As a processor performing the reference count regeneration process reads a contiguous block of VTT entries, the processor may encounter references to track numbers that are widely dispersed throughout the name space of track numbers. The wide dispersion leads to random access patterns that must be processed by memories holding the reference counters during the regeneration process. Processor memory is well suited to holding the reference counters. However, processor memory size is limited and is typically much smaller than the size of the disk cache memory that holds the mapping tables.

In order to accommodate the limited size of the memory of each processor, the conventional approach assigns a range of track numbers to each processor. Each processor then reads the entire VTT and processes only the track numbers that are currently assigned to that respective processor. The processor then merges respective assigned track number reference counts into the corresponding entries in the TNT. When the combined sizes of the memories of the processors are not large enough to hold all of the track number reference counts, one or more processors will have to perform a second pass through the VTT entries as each processor tallies the references to another set of track numbers. The requirement for a second pass through the VTT entries significantly increases the amount of time required to complete the reference count regeneration process.

The third limitation is due to the speed of the processor memory. Even though processor memory is better suited to random data access patterns than disk cache memory, which is optimized for sequential block transfers, the speed of processor memory still limits the rate at which reference count regeneration can be performed. Modern processors employ high speed caches. Some of the high speed caches are integrated with the processor on the same integrated circuit device. Integrated caches, which are well known in the data processing art, can be accessed much more quickly than processor memory. However, the integrated caches are typically much smaller than processor memory. As a consequence, the random memory access patterns that result from the process of tallying references to track numbers yield high processor cache miss rates. Therefore, the speed of processor memory plays a significant role in determining the amount of time required to perform reference count regeneration. While the duration of the reference count regeneration process can be reduced by increasing the speed of processor memory, increasing processor memory speed is an undesirable alternative because of the cost to provide a very large memory that is also very fast.

Thus, there exists a need for an improved system and method for reference count regeneration. Such a system and method would generally increase the rate of reference count regeneration, yielding a reduction in the time required to regenerate a given number of reference counts, or, alternatively, yielding an increase in the number of reference counts that can be regenerated in a specified amount of time. The increased rate generally reduces the amount of time required for the data storage subsystem to recover from an error condition and generally increases the amount of data that can be managed by the data storage subsystem. As such, both of the improvements generally increase the value of the data storage subsystem. The present invention generally provides a system and a method for achieving such an improvement based on the implementation of additional hardware mechanisms (i.e., apparatuses, circuits, systems, etc.) and respective methods (i.e., routines, processes, etc.) in connection with disk cache, reference count regeneration hardware and interconnection fabric.

SUMMARY OF THE INVENTION

The present invention generally provides new and innovative systems and techniques for reference count regeneration. The present invention provides for achieving such an improvement based on the implementation of an improved system and an improved method in connection with disk cache, reference count regeneration hardware, and interconnection fabric. Such new and innovative systems and techniques can increase the rate of reference count regeneration (i.e., make the reference count regeneration process more rapid), and thus improve overall data storage system value.

According to the present invention, in a disk-based data storage system, a controller configured to control a reference count regeneration operation is provided. The controller comprises a control register, an address register, a status register, a boundary register, and an embedded memory. The control register may be configured to set up and initiate program instructions that are executed by at least one processor. The address register may be configured as a cache address pointer and corresponding to at least one of a sort output list pointer, a virtual track table (VTT) input list pointer, a reference list pointer, a track number table (TNT) pointer, and a reference count mis-compare list pointer. The status register may be configured to indicate status of a routine controlled by the controller. The routine comprises at least one of a radix sort, a reference list count, a combine counts, and a merger of the reference list count into the TNT to generate an updated TNT. The boundary register corresponds to a disk cache memory that is configured to store at least one of a reference list, a reference list count length, and a mis-compare list. The embedded memory may be configured to perform at least one buffer operation in connection with the routine controlled by the controller.

The control register used by the controller may be configured to perform at least one of specifying an operation controlled by the controller, specifying a starting bit number and a length of a field related to a sort operation controlled by the controller, specifying a starting bit number and a length of a field related to a list length counting operation controlled by the controller, and to specifying whether an input list originates from the VTT or from a reference list.

The control register used by the controller may be configured to specify a starting bit number and a length of a field that selects a reference counter to be incremented when the operation controlled by the controller is a count operation.

The control register used by the controller may be configured to specify at least one of the reading of count values from the embedded memory and writing of the count values into the embedded memory when the operation controlled by the controller is a combine counts.

The control register used by the controller may be configured to specify size of a TNT entry and a starting bit number and a length of a reference count field within a TNT entry when the operation controlled by the controller is a merge.

The controller may further comprise a comparator coupled between the boundary register and the address register to compare entries in the boundary register to a respective one of entries in the address register to determine when an address has reached a boundary, and when the comparator determines that the address register has reached the corresponding boundary, the comparator presents at least one signal to a control block processor, wherein the signal indicates that an output list has filled the disk cache memory that has been allocated for the output list, or, that a respective operation has reached the end of an input list and the operation has completed.

The controller may further comprise a list length register configured to store a list length value that is generated by the radix sort.

Also according to the present invention, in a disk-based data storage system, a method for reference count regeneration is provided. The method comprises setting up and initiating program instructions that are executed by at least one processor in a control register. The method also includes providing an address register configured as a cache address pointer and corresponding to at least one of a sort output list pointer, a virtual track table (VTT) input list pointer, a reference list pointer, a track number table (TNT) pointer, and a reference count mis-compare list pointer. The method further includes providing a status register configured to indicate status of a routine controlled by the controller. The routine comprises at least one of a radix sort, a reference list count, and a merger of the reference list count into the TNT to generate an updated TNT. The method further comprises providing a boundary register corresponding to an assigned memory region that is configured to store at least one of a reference list, a reference list count length, and a mis-compare list. The method further comprises providing an embedded memory configured to perform at least one buffer operation in connection with the routine controlled by the controller.

The control register used by the method may be configured to perform at least one of specifying an operation controlled by the controller, specifying a starting bit number and a length of a field related to a sort operation controlled by the controller, specifying a starting bit number and a length of a field related to a list length counting operation controlled by the controller, and to specifying whether an input list originates from the VTT or from a reference list.

The control register used by the method may be configured to specify a starting bit number and a length of a field that selects a reference counter to be incremented when the operation controlled by the controller is a count operation.

The control register used by the method may be configured to specify at least one of the reading of count values from the embedded memory and writing of the count values into the embedded memory when the operation controlled by the controller is a combine counts, and to specify size of a TNT entry and a starting bit number and a length of a reference count field within a TNT entry when the operation controlled by the controller is a merge.

The method may further comprise providing a comparator coupled between the boundary register and the address register to compare entries in the boundary register to a respective one of entries in the address register to determine when an address has reached a boundary, and when the comparator determines that the address register has reached the corresponding boundary, the comparator generally presents at least one signal to a control block processor. The signal generally indicates that an output list has filled the disk cache memory that has been allocated for the output list, or, that a respective operation has reached the end of a input list and the operation has completed.

The method may further comprise providing a list length register configured to store a list length value that is generated by the radix sort.

Further, according to the present invention, in a disk-based data storage system, a controller configured to control a reference count regeneration is provided. The controller comprises a processor and a disk cache memory. The processor may be configured to dynamically execute functional code. The functional code generally determines the implementation of at least one operation in response to the size of at least one list generated by an initial radix sort of a virtual track table (VTT), and the operation comprises one of a subsequent radix sort of the at least one list generated by the initial sort, a count of entries in the at least one list generated by the initial sort, and a merge of the at least one list generated by the initial sort into a track number table (TNT). The disk cache memory may be configured to hold the VTT, the TNT, and the at least one list.

The functional code further generally determines how many instances of a hardware mechanism to implement in a particular application such that the reference count regeneration completion time is minimized.

The functional code may further set up command registers, address registers, and boundary registers for each of the operations dynamically executed by the processor.

The functional code may further check status of the at least one operation via a status register.

When a sort operation terminates prematurely, the functional code generally provides instructions to retain the location of a filled list region, allocate a new region, reload a corresponding address register and a boundary register, and provide the controller an indication that the sort operation can continue.

When a sort operation completes, the functional code generally provides instructions to read a list length register and implement a list length value contained in the list length register, and allocate a memory region for a next sort operation, and the allocated memory region is large enough to ensure that the next sort operation will not terminate due to insufficient memory space for a reference list.

When an error occurs the functional code generally provides instructions to manage recovery and the recovery comprises a retry routine.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
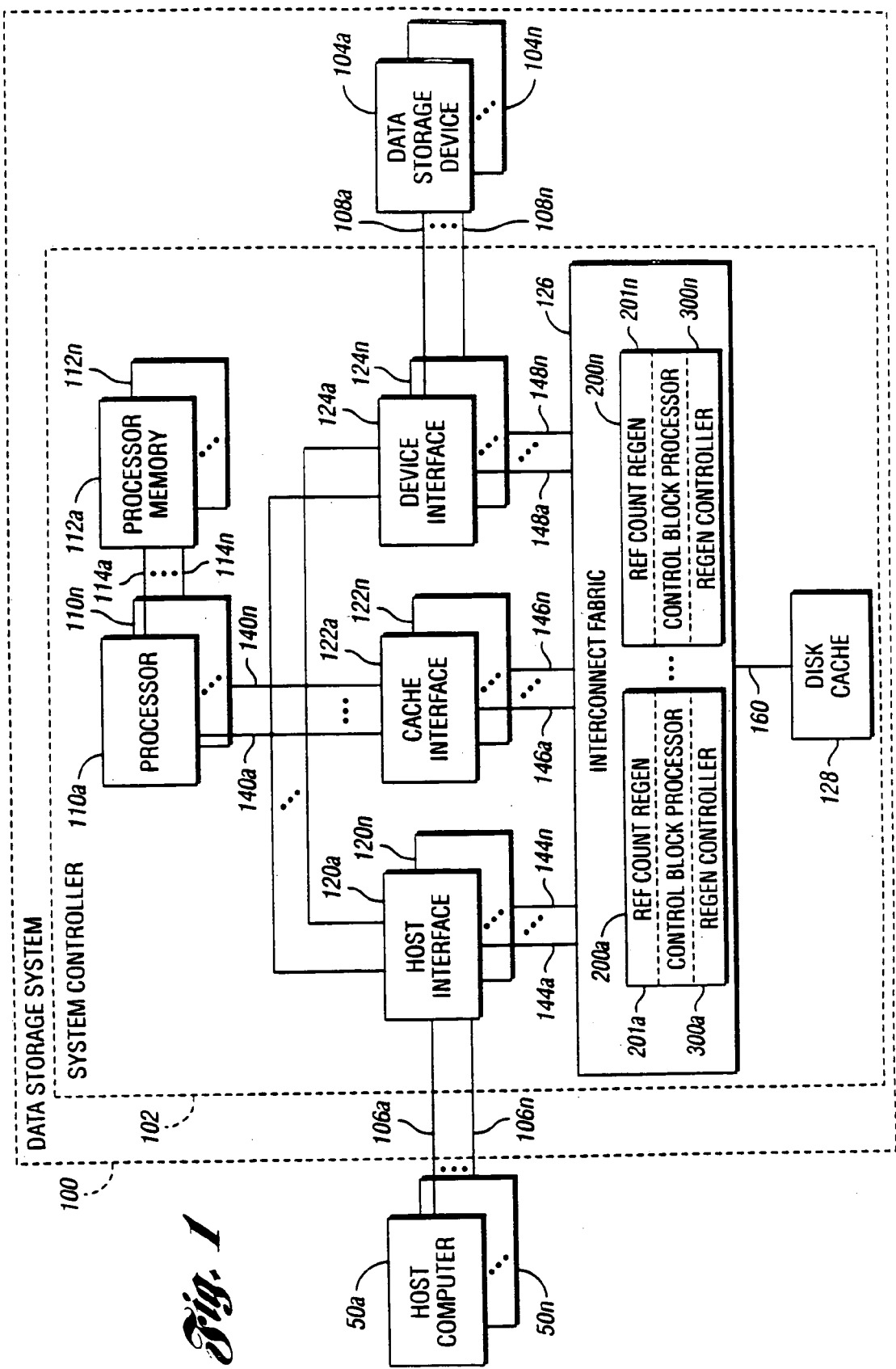
FIG. 1 is a block diagram of a data storage subsystem architecture where the reference count regeneration system of the present invention may be implemented.

With reference to the Figures, the preferred embodiments of the present invention will now be described in detail. The present invention may be implemented in connection with disk-based data storage systems where data can be arranged in virtual tracks that can be further aggregated to comprise virtual storage devices. The disk-based data storage system generally maps the virtual tracks to actual data contained on physical disk tracks instead of storing the actual data in the virtual devices.

A reference count may be implemented to provide an indication of the number of virtual tracks that refer to the data stored at a particular location on a particular physical disk track. Thus, the reference count generally identifies the number of virtual tracks that refer to identical data. The reference counts may be generated to maintain a record of the number of virtual locations in the name space of virtual tracks at which a given piece of data resides. Reference count related information may be implemented to provide a data storage system user a rapidly generated copy of a user specified set of virtual tracks or even generating a copy of an entire virtual storage device via manipulation of a table (i.e., virtual track table, VTT) containing references to the data being copied and manipulation of the reference counts that track the number of references to each unit of data.

In one example, an entry in a VTT may contain the identity of the location on physical disk of the data. However, in a preferred embodiment, each VTT entry refers instead to an entry in another table (i.e., a track number table, TNT). The reference value (i.e., a track number) stored in a VTT entry generally selects an entry in the TNT. The TNT entry generally contains the identity of the location (e.g., address) on a physical disk of the data to which the VTT entry ultimately refers. Many VTT entries may contain a reference to a single TNT entry. However; only one TNT entry refers to a particular location on the physical disk. The two-level mapping table structure (i.e., a VTT and a TNT) generally provides minimization of the number of mapping table updates that the disk-based data storage system must perform when the data referred to by a TNT entry is moved from one location on physical disk to a different location on a potentially different physical disk. In a preferred embodiment, such a movement of data generally provides for the data storage system to update only a single TNT entry. When the identity of the location on physical disk of the data is stored within the VTT entries, a movement of the data generally provides for the data storage system to update all of the VTT entries that refer to the data that was moved.

The present invention generally relates to data storage subsystems and, in particular, to data storage subsystems that implement a snapshot copy process to copy a data file. The snapshot copy process generally provides for duplicating the data file pointer in a mapping table to reference the original data file, such that the name used to identify the original data file and the name used to identify the copied data file are both mapped to the same physical data storage location. The data storage subsystems that implement a snapshot copy process generally maintain a reference count for each physical location representing a data file. The reference count generally contains the number of data file names that are mapped to the physical storage location. A process of rapidly determining the reference counts, such as the process of the present invention, may be beneficial to a user.

Reference count regeneration may be implemented as a process comprising scanning the VTT for valid track numbers, tabulating occurrences (i.e. determining or generating a number of references) to each unique track number in at least one respective predetermined memory block in the TNT, and updating a respective reference count field in the TNT. The VTT and the TNT are generally implemented in the disk cache within the data storage system.

Generally, the present invention provides an improved system and an improved method for reference count regeneration. The present invention is generally implemented in connection with a disk-based data storage system and associated interconnecting fabric. The present invention generally implements a more speed efficient approach than conventional approaches. The present invention includes performing all reference count regeneration related operations using disk cache memory and special hardware mechanisms (e.g., circuitry) attached to the interconnecting fabric rather than passing all virtual track data references and a respective track number table from disk cache through processor memory. Implementation of disk cache memory in the present invention generally avoids the memory size limitations that can occur when using processor memory as is implemented in some conventional approaches. The present invention also generally reduces or eliminates the data transfer speed limitations that are encountered when data transfers via control buses are implemented as in conventional approaches to reference count regeneration.

By implementing the entire reference count regeneration operation in disk cache, the present invention may ensure that read and write operations performed by the respective hardware mechanisms are buffered to sufficiently large block sizes such that the maximum bandwidth from the block-oriented cache memories and interconnect may be obtained. In contrast, conventional approaches that tabulate the number of references to each unique track number by reading each VTT entry and incrementing the reference counter for the track number referred to by the VTT entry can generate inefficient memory access patterns.

When the distribution of track numbers within the VTT is substantially random, most of the read/increment/write operations that tabulate references to track number addresses reference counters that are stored in widely dispersed memory locations. Maintaining the reference counters in disk cache memory may result in many slow and inefficient accesses to the block-oriented cache memory and inefficient use of the block-oriented interconnect. To overcome the deficiencies of conventional approaches, the present invention generally implements a number of routines (i.e., processes, operations, etc.) to generate the final track number table (TNT). The routines of the present invention may be designated as sort, count, combine counts and merge routines and are described in more detail below in connection with FIGS. 1–4.

Referring to FIG. 1, a diagram illustrating a dynamically mapped virtual data storage system 100 is shown. A preferred embodiment of the reference count regeneration system (or method) of the present invention (as described below is connected with FIGS. 2–4) may be implemented in connection with the data storage system 100. However, the reference count regeneration system and method of the present invention may be implemented in connection with any appropriate data storage system to meet the design criteria of a particular application. The data storage system 100 may be connected to at least one host computer 50 (e.g., host computers 50a–50n).

The data storage system 100 generally comprises a system controller 102, at least one data storage device 104 (e.g., data storage devices 104a–104n), at least one bus (or data channel) 106 (e.g., buses 106a–106n), and at least one bus (or data channel) 108 (e.g., buses 108a–108n). The bus 106 generally couples (or connects) the at least one host computer 50 to the data storage system controller 102. The bus 108 generally couples the system controller 102 to the at least one data storage device 104.

The system controller 102 generally comprises at least one processor 110 (e.g., processors 110a–110n) coupled or connected to at least one respective processor memory 112 (e.g., processor memories 112a–112n) via at least one bus 114 (e.g., buses 114a–114n), at least one host interface 120 (e.g., host interfaces 120a–120n), at least one cache interface 122 (e.g., cache interfaces 122a–122n), at least one device interface 124 (e.g., device interfaces 124a–124n), an interconnect fabric 126, and a disk cache 128.

The system controller 102 generally further comprises at least one bus (or data channel) 140 (e.g., buses 140a–140n) that may couple respective processors 110, host interfaces 120, cache interfaces 122, and device interfaces 124, at least one bus (or data channel) 144 (e.g., buses 144a–144n) that may couple the at least one host interfaces 120a–120n to the interconnect fabric 126, at least one bus (or data channel) 146 (e.g., buses 146a–146n) that may couple the at least one cache interfaces 122a–122n to the interconnect fabric 126, at least one bus (or data channel) 148 (e.g., buses 148a–148n) that may couple the at least one device interfaces 124a–124n to the interconnect fabric 126, a bus (or data channel) 160 that may couple the interconnect fabric 126 and the disk cache 128. The buses 140, 144, 146 and 148 may be implemented as control buses. The bus 160 may be implemented as one or more independent serial links, as an n-bit wide bus (not shown), or, alternatively, as a combination of independent serial links and one or more parallel buses (not shown).

The interconnect fabric 126 generally comprises a number (i.e., at least one) node. At least one of the nodes generally comprises a reference count regeneration system 200 (e.g., systems 200a–200n, described in more detail in connection with FIGS. 2–4). Each of the reference count regeneration systems 200 generally comprises a respective control block processor 201 (e.g., processes 201a–201n) and a respective regeneration controller 300 (e.g., controllers 300a–300n, described in more detail in connection with FIG. 4).

The data storage system 100 is generally configured to store data files for the host computer 50 in data storage devices 104. The host computer 50 may transmit a data file for storage in the data storage system 100 over a selected one of the data channels 106 that interconnect the host computer 50 with the data storage system 100. The host computer 50 generally assigns a virtual track address to the data file transmitted to the data storage system 100 and the received data file is generally stored in an allocated physical storage location in the data storage devices 104.

The data storage devices 104 are generally implemented as disk drives. The assignment of a physical storage location on the data storage devices 104 may be generated by a controller (e.g., the controller 102) contained within the data storage system 100. The controller 102 may define a correspondence between a virtual track address assigned by the host computer 50 and the physical storage address of the stored data file. A translation of the virtual track address to the physical storage address corresponding to the physical storage location generally comprises the "dynamically mapped virtual" aspect of the data storage system 100. A disk cache memory 128 is generally implemented in the data storage system 100 to provide temporary storage for data files as well as temporary storage for data used by the controller 102. In a preferred embodiment, the virtual track table (VTT) and the track number table (TNT) that define the mapping from a virtual track address to a physical storage location are stored within the disk cache memory 128.

Within the controller 102, the one or more processors 110 may interpret commands received from the host computers 50a–50n, generate commands to be processed by the data storage devices 104a–104n, and manage the flow of data through the data storage system 100. The one or more control buses 140 generally connect the processors 110 to the host interface circuitry 120, cache interface circuitry 122, and device interface circuitry 124. The interconnect fabric 126 and the buses 144, 146, and 148 generally provide an interface for data to move throughout the data storage system 100 at high transfer rates. The control buses 140, on the other hand, are generally configured to carry control signals and status information signals among the processors and the various sets of interface circuitry. The buses 140 are not generally configured to carry large amounts of data at high rates. Conventional methods of reference count regeneration necessitate transfer of mapping table information (i.e., the VTT and TNT information) that is stored within data cache over control buses. The improved system and method of the present invention may reduce or eliminate conveyance (or transfer) of mapping table information to the processors over control buses.

Figure 2:
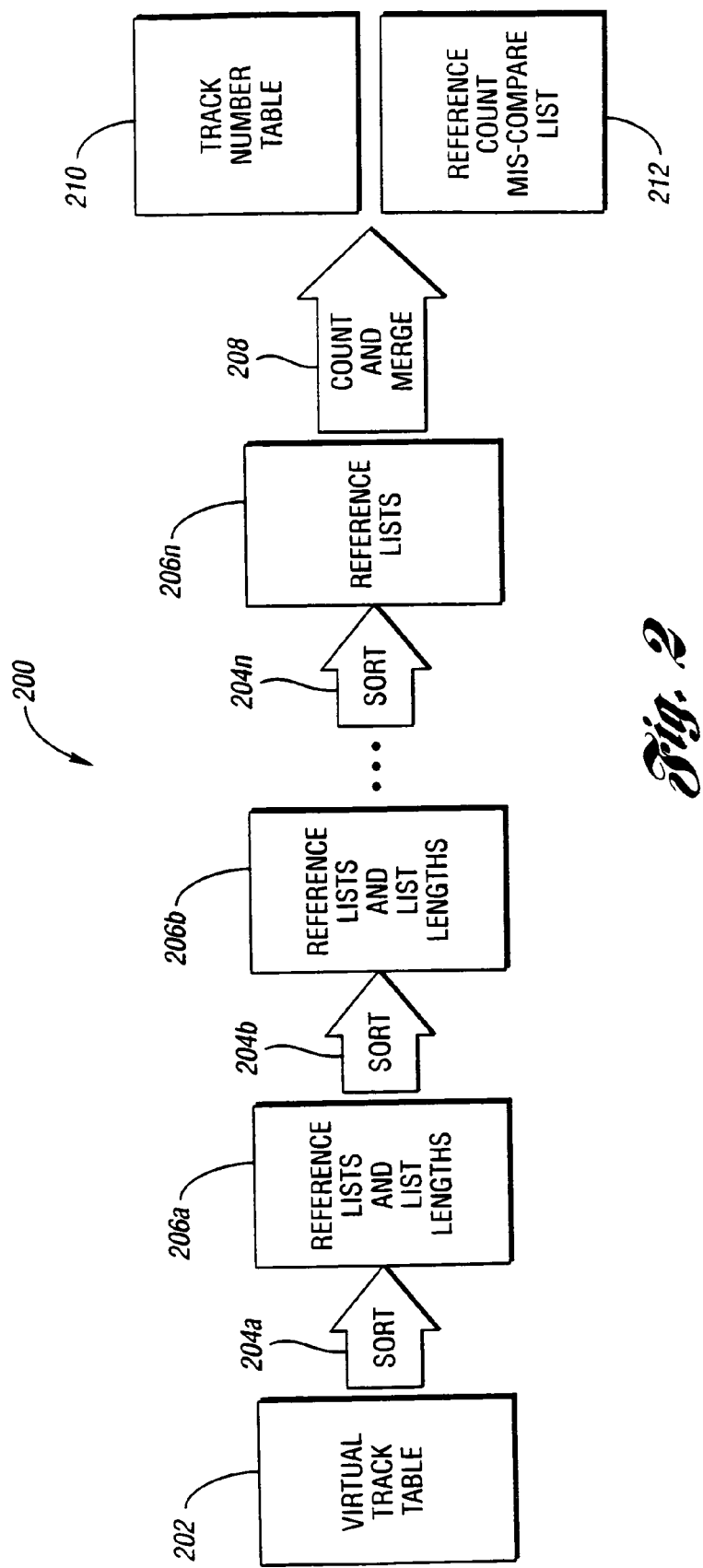
FIG. 2 is a diagram illustrating a reference count regeneration system according to the present invention.
Figure 3:
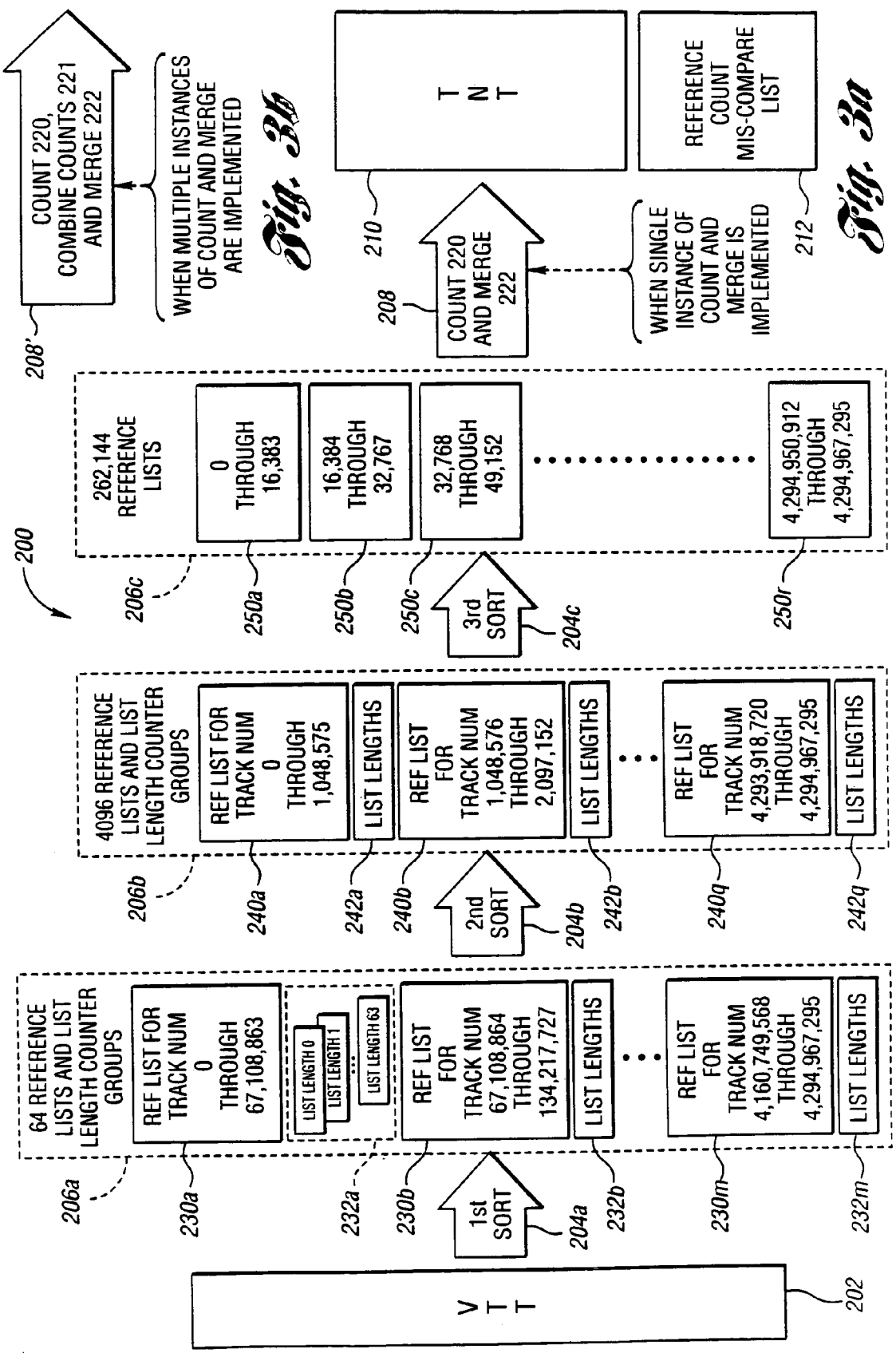
FIGS. 3(a–b) are detailed diagrams of the reference count regeneration system of FIG. 2.

Referring to FIG. 2, a diagram illustrating a reference count regeneration system (or mechanism) 200 in accordance with a preferred embodiment of the present invention is shown. The system 200 is generally implemented in connection with (i.e., integral to) a disk-based data storage system disk cache and interconnection fabric (e.g., at appropriate nodes in the interconnection fabric). In one example, the regeneration system 200 may be implemented in connection within (e.g., at one or more nodes of) the interconnection fabric 126. However, the system 200 may be implemented in connection with any appropriate data storage system to meet the design criteria of a particular application.

The system 200 generally comprises a virtual track table (VTT) 202 that may be sorted by at least one sort process (e.g., routine, blocks, technique, steps, method, operation, etc.) 204 (e.g., sorts 204a–204n) to generate at least one respective reference list and list length 206 (e.g., blocks 206a–206n). The VTT 202 generally comprises a tabulation of references to entries in a track number table (TNT) 210 which, in turn, may refer to the data content of respective virtual tracks that comprise virtual devices in the data storage system where the system 200 is implemented. The sorts 204 may be implemented as radix sorts (i.e., distribution sorts at a particular number base or bit width) that may be configured to serially generate the respective blocks 206 from the VTT 202 and subsequently from the previous sort results (i.e., the first sort 204a may generate first block 206a from the VTT 202, the second sort 204b may generate the second block 206b from the first block 206a, and so on). In one example, the final block 206 (e.g., block 206n) may be counted and merged by a process 208 (described in connection with FIG. 3a). In another example, the final block 206 may be processed via a count, combine counts, and merge process 208' (described in connection with FIG. 3b). When only one block 206 is implemented, the process 208 (or, alternatively, the process 208') may operate on the singe block 206 that is generated by the single sort 204.

The sort routine 204 is generally configured to organize valid entries of the VTT 202 into a set of reference lists and list length information (or values) (described in more detail below in connection with FIG. 3a). The sort routine 204 is generally implemented in the respective cache via software, firmware, hardware, or any appropriate combination thereof.

The sort processes 204 generally yield (i.e., generate, produce, etc.) one or more reference lists and respective list length information tables. Each reference list generally comprises all of the references to a contiguous range of entries in the TNT 210. The range of entries is generally small enough such that the references (i.e., occurrences) that comprise each of the lists in block 206 can be counted using a block of memory embedded in the reference count regeneration hardware (described below in connection with FIG. 4) of the system 200. The reference lists in the blocks 206 may be generated through an iterative series of radix sorts (e.g., the radix sorts 204). The radix sorts 204 may be executed at an appropriate bit width that may be predetermined (i.e., selected, chosen, etc.) to comply with reference count regeneration hardware design criteria such as disk cache attributes including size, access time, and the like.

The sort processes 204 subsequent to the sort 204a generally allocate sufficient memory for holding the reference lists via the list length information in each respective block 206. For example, block 206a generally contains the lengths of the reference lists that will be generated by sort process 204b and stored in block 206b. Since the sort 204n is generally the last of the sort process, the sort process 204n generally does not generate list length information. Therefore, block 206n generally contains reference lists and not list length information.

After the completion of the radix sorts 204, the track numbers referred to by entries in the VTT 202 are generally partitioned into at least one reference list in at least one block 206. The entries within a particular reference list within a particular block 206 generally all refer to track numbers within a contiguous range of track number values. The count and merge process 208 generally uses the information contained within a particular reference list within a block 206 to tabulate the number of references to each of the TNT entries in the respective subset of TNT 210 and to merge the counts of the number of the reference into the TNT entries within the respective predetermined subset of TNT 210. The count and merge process 208 is generally repeated for each of the reference lists within one or more blocks 206 and for corresponding predetermined subsets of TNT 210.

The process 208 may be configured to generate the updated track number table 210 and an updated reference count mis-compare list 212. The TNT 210 generally comprises at least one count field (not shown) that may be configured to store each reference (i.e., occurrence) count number to each unique track number in at least one respective predetermined memory block in the TNT 210. In one example, the count and merge process 208 generally comprises a count process 220 and a merge process 222 (described in connection with FIG. 3a). In another example (described in more detail in connection with FIG. 3b), a process 208' may further comprise a combine counts process 221. The sort 204 and the count and merge 208 are generally implemented via appropriate hardware (e.g., logic gates, buffers, etc.), firmware, and software or any combination thereof.

The count and merge process 208 generally merges the reference counts (i.e., the data to be stored in the at least one count field in the TNT 210) into the respective predetermined entries in TNT 210. The count and merge process 208 generally compares (via compare hardware, described in connection with FIG. 4) the newly generated reference counts to the reference counts contained in the TNT entries 210. The count and merge process 208 generally replaces the respective predetermined reference counts contained in the TNT entries 210 with the newly generated reference counts. When the count and merge process 208 detects (or determines) that a reference count value in a TNT entry within the TNT 210 is not equal to the corresponding (or respective) newly generated reference count (e.g., via a comparison process), the count and merge process 208 generally writes the track number that selects the TNT entry containing the erroneous reference count and the reference count read from the TNT entry into the reference count mis-compare list 210.

Referring to FIG. 3a, a detailed diagram illustrating an example implementation of the reference count regeneration system 200 is shown. In one example, the reference count regeneration process implemented via the system 200 may be implemented having track numbers that are 32 bits wide and all of the possible 32-bit binary values may be valid track numbers. The sort process 204a may be implemented as a radix sort that is generally capable of sorting on six bits of the track number (or any appropriate predetermined radix) in a given pass generating 64 separate reference lists (or subsets, sections sub blocks, etc.) (e.g., lists 230a–230m) in the sort pass that corresponds to the block 206a. The count process 220, the combine counts process 221 (described in more detail in connection with FIG. 3b), and the merge process 222 generally operate on a 16,384 entry subset (not shown) of the TNT 210. When the given parameters are implemented, the reference count regeneration process of the present invention (e.g., a reference count regeneration process that may implement the system 200) may operate as described below.

While reference list 230a is illustrated as a single block of reference values, reference list 230a may be stored in one or more blocks of contiguous cache memory locations. The contiguous blocks of cache memory may reside in separate and distinct regions of the cache memory space. At the initiation of the first sort 204a, a respective length of each of the reference lists 230a–230m at the completion of the first sort 204a is generally unknown. In lieu of reserving sufficient memory to hold the largest possible list length for every one of reference lists 230a through 230m, the first sort process (i.e., the sort 204a) generally allocates a smaller amount of memory for each reference list. When the sort process 204a encounters an end of the region of memory allocated for a reference list (e.g., reference list 230a), an additional memory region may be allocated to hold further references that comprise the respective reference list. The additional memory region may not be physically contiguous with the segment of memory that was previously allocated for the respective reference list. However, the list is nonetheless handled as a single logical list that may be physically stored in one or more segments of contiguous memory. Appropriate methods for managing lists that occupy variable length segments of memory are generally well known in the data processing art.

The first pass of the sort processes (i.e., the sort 204a) generally reads the VTT 202, extracts the valid references (using a two bit key field, not shown), and sorts the references into 64 lists (e.g., the lists 230a–230m of the block 206a). Each list (or subset, section, sub block, etc.) 230 generally contains all the references to a respective contiguous predetermined (e.g., 67,108,864 entry) block (or section, sub block, subset, etc.) of track numbers in the TNT 210. Each of the reference lists 230a–230m generally has a respective list length memory region allocation 232 (e.g., list lengths 232a–232n). Each of the lists 230 generally comprises a plurality of sub-lists wherein each of the sub-lists contains references to a unique range of entries in the TNT 210.

A second pass of the sort process (i.e., the sort 204b) generally sorts the 64 lists 230 of the block 206a (over non-empty groups of elements of the block 206a) into 4096 lists (or subsets, sections, sub blocks, sub-lists, etc.) (e.g., the lists 240a–240q), and each list 240 generally contains all of the references to a contiguous block of 1,048,576 track numbers. Each of the reference lists 240a–240q generally has a respective list length memory region allocation 242 (e.g., list lengths 242a–242q).

A third (and in the example illustrated in FIG. 3a, a final) pass of the sort process (i.e., the sort 204c) generally sorts the 4096 lists 230 of the block 206b (over non-empty groups of elements of the block 206b) and sorts them into 262,144 lists (or subsets, sections, sub blocks, sub-lists, etc.) (e.g., lists 250a–250r of block 206c), and each list 250 generally contains all of the references to a contiguous block of 16,384 track numbers. While the example of FIG. 3a illustrates three sorts 204 and the respective blocks 206, the system 200 may be implemented having any appropriate number of sorts 204 and blocks 206 to meet the design criteria of a particular application.

When the sort process 204a encounters the end of a memory region and an additional memory region is allocated to hold further references (e.g., further entries in the reference list 230a), the memory allocation steps may disrupt the flow of the sort process 204a. The disruption generally produces undesirable delays in the sort process 204a. During the first sort process (e.g., the sort 204a), a predetermined number (e.g., 64 or other appropriate predetermined number) of reference lists are allocated. The regions of memory allocated for holding the reference lists 230 are generally large enough to provide the sort process 204 adequate memory 230. However, for subsequent sort processes (e.g., sorts 204b–204n), the lists (e.g., the lists 240, 250, etc.) are generally smaller and the allocated memory regions are generally correspondingly smaller.

The generation of the increasingly smaller reference lists during the subsequent sort processes (e.g., sorts 204b–204g) may expend a larger portion of the time that is expended allocating memory regions. In a preferred embodiment, the sort process 204a may calculate the respective lengths 232 of the reference count lists 230 that may be generated by sort process 204b. The sort process 204b may calculate the respective lengths of the reference lists that will be generated by the sort process 204c, and so on.

The sort 204a generally divides the valid references in the VTT 202 into a predetermined number (e.g., 64) of reference lists (e.g., lists 230a–230m). The sort 204a may use a six-bit wide field in a binary representation of the valid track numbers contained in the VTT 202 to select the particular list 230 where the track number may be written. When the six bits in the binary representation of a track number are numbered right to left such that bit 0 is the least significant bit, bit 1 is the next more significant bit and so on, sort 204a generally compares bits 31 through 26 of the track number values in the VTT 202 to determine the particular reference list 230 where the track number will generally be written. When the six bits contain the binary value 000000, the sort 204a generally writes the track number into the reference list 230a. When the binary value is 000001 the sort 204a generally selects the reference list 230b, and so on, through the binary value 111111, which generally selects the reference list 230m. Thus, each reference list contains references to the track numbers within a unique range of track number values. Furthermore, a union of the members of the first set of unique ranges of entries in the TNT 210 may contain all of the entries in the TNT 210.

The sort 204a generally determines reference list length 232 information by reading bits 25 through 20 of the track number values in the VTT 202. In the illustrated FIG. 3a, bits 25 through 20 may be the bits that are used in connection with the second sort (e.g., 204b). The sort 204a generally provides 64 list length counters (described in more detail in connection with FIG. 4) for each reference list 230. The sort 204a may generate 64 reference lists 230a–230m. The 64 counters for each list 230 may generate a total of 4096 list length counters that may be maintained by the sort 204a. When the sort 204a reads a track number value where the bits 31 through 26 contain the binary value 000000, the sort 204a generally adds the track number to reference list 230a (i.e., the reference list selected by binary value 000000).

The first sort (e.g., the sort 204a) may also use the bits 31 through 26 of the track number to select (i.e., determine) the group of 64 list length counters that may be associated with the reference list 230a. The sort 204a may read bits 25 through 20 of the track number and use the binary value of the bits 25 through 20 to select a particular one of the 64 list length counters that are associated with reference list 230a. The sort 204a may increment the selected counter. The counter selected by the binary value 000000 in bits 25 through 20 of the track number generally identifies the number of track number values that may be stored in the reference list 240a at the completion of the second sort (e.g., the sort 204b). Similarly, the counter selected by the value 000001 in bits 25 through 20 generally identifies the length of reference list 240b at the completion of second sort 204, and so on for each of the remaining 4094 list length counters.

The values contained in the list length counters at the completion of sort 204a may be used by the sort 204b to determine an amount of memory space to allocate for each of the reference lists 240a–240q. The information provided by the list length counters generally provides the sort 204b a method for selection of positions (i.e., locations, regions, etc.) of the reference lists 240a–240q in memory such that the number of occurrences when the sort process 204b encounters the end of a memory region and has to allocate an additional memory region to hold further references in one or more of the reference lists 240 is minimized.

Similarly, the second sort 204 (e.g., the sort 204b) may generate reference list lengths for the reference lists 250 that may be generated via the third sort (e.g., the sort 204c). The second sort 204 is generally performed 64 times, once for each of the 64 reference lists 230a–230m. During the time the second sort 204 is processing one of the reference lists 230, for example reference list 230a, the second sort 204 may use bits 25 through 20 of track numbers that are generally read from reference list 230a to select the particular reference list 240 where the second sort 204 may write the respective track number. The bits 25 through 20 of the track number may also be used to select the group of 64 list length counters that hold the lengths of the lists to be generated when the third sort 204 processes the reference list 240 where the second sort 204 may write the respective track number. The bits 19 through 14 of the track number may be used to select the particular one of the 64 counters in the group of counters selected by bits 25 through 20 to be incremented during the second sort 204.

At the completion of the sort 204b, the values contained in the 4096 list length counters may identify the lengths of the 4096 reference lists 250 that may be generated by the sort 204c when the sort 204c reads the 64 reference lists generated by sort 204b during the processing of the reference list 230a. When the sort 204b processes reference list 230b, the sort 204b may generate another set of 4096 list length count values. The list length count values may identify the lengths of the 4096 reference lists 250 that may be generated by the sort 204c when the sort 204c reads the 64 reference lists that were generated via the sort 204b during the processing of the reference list 230b. The sort 204b performs the process of list length generating another 62 times, generating the remaining 3968 reference lists 240.

The sort 204b generates the 4096 reference lists 204a through 204q. The sort 204b may identify the lengths of all 262,144 (256 k) reference lists 250 that may be generated by the sort 204c. The information provided by the list length counter values may be used by the sort 204c to select the amount of space to be allocated for holding reference lists 250a through 250r. The sort 204c may allocate regions of memory for reference lists 250 such that the number of occasions in which sort process 204c encounters the end of a memory region for one of the reference lists 250 and has to allocate an additional memory region for the reference list 250 is minimized.

When memory space is limited, to reduce or prevent the likelihood of exceeding the memory space available in minimum cache configurations of the storage systems where the present invention may be implemented, additional operations and passes through the VTT 202 (e.g., multiple sorts 204 and the respective generation of multiple blocks 206) may be implemented. The size of disk cache that is implemented in connection with the present invention may be related to the number of virtual tracks (not shown) that correspond to the VTT 210 such that potential memory limitations may be reduced or eliminated.

The count and merge process 208 comprises the count process 220 and the merge process 222 and, alternatively, the combine counts process 221 (in connection with the process 208'). The count process 220 generally reads the respective reference list 250 that describes all references to a corresponding subset of 16,384 TNT entries 210. The count process 220 generally counts the number of references to each of the entries in the respective subset of the TNT entries 210, yielding (or generating) 16,384 reference count values.

The merge process 222 generally reads the predetermined respective subset of 16,384 TNT entries from the TNT 210 that correspond to the reference list processed by the count process 220 and, alternatively, by the combine counts process 221 (in connection with the process 208'). The merge process 222 generally compares the reference count values in the TNT entries read from the TNT 210 to the reference count values generated by either of the count 220 process or the combine counts 221 process. When the reference count value contained in a TNT entry is not equal to the newly generated reference count, the merge process 222 generally writes an entry into reference count mis-compare list 212 as described above in connection with FIG. 2. The merge process 222 generally replaces the reference count value in the TNT with the newly generated reference count value and writes the updated TNT entry back into the TNT 210. In a preferred embodiment of the present invention, when the merge process 222 determines that a block of contiguous TNT entries having the newly generated reference counts is equal to the reference counts in the TNT entries, the merge process 222 generally skips (i.e., refrains from) writing the unchanged TNT entries back into the TNT 210.

The merge process 222 may be configured (e.g., Via at least one routine implemented in a processor 110) to avoid (i.e., refrain from) writing reference count mis-compare information into the reference count mis-compare list 212 or, alternatively, to limit the number of entries that the merge process 222 generally writes into the reference count mis-compare list 212. The data in the reference count mis-compare list 222 may provide the highest benefit to the user when the process of regenerating the reference counts is performed under circumstances in which the processor 110 determines that the TNT 210 contains very few (i.e., less than a first predetermined number) incorrect reference counts. In another example, when many (i.e., greater than a second predetermined number which is generally higher than the first predetermined number) reference counts in the TNT 210 are incorrect, the processor 110 may increase the speed of the reference count regeneration (e.g., the method 200) by preventing the merge process 222 from writing entries into the reference count mis-compare list 212. The processor 110 may be configured to conserve memory by limiting the size of the reference count mis-compare list 212 even in circumstances where few (i.e., less than the first predetermined number) reference count mis-compares are expected by the user.

The general hardware and software requirements to implement the process (i.e., method, routine, steps, operation, etc.) corresponding to the system 200 of the present invention are described in more detail in connection with FIG. 4. In general, the total number of accesses to the disk cache where the system 200 is implemented for the example illustrated in FIG. 3 may be:

(1 read*the size of the VTT 202)+(3 reads+3 writes)*(the size of valid references stored in the lists 250)+(1 read and 1 write)*(the size of the TNT 210).

Since the size of the memory for storage of the valid references (e.g., the block 206c) is generally less than the size of the memory for storage of the VTT 202, the number of accesses implemented in connection with the reference count regeneration of the present invention compares favorably to the conventional approach where the respective VTT is scanned once for each processor 110 that is implemented. The comparison may be especially beneficial when seven or more processors 110 are implemented. Furthermore, since conventional approaches for reference count regeneration typically require the respective VTT to be transferred over a control bus, the amount of time expended performing the reference count regeneration steps in connection with the present invention is less than the time required by the conventional approach when the rate at which cache data is transferred over control bus 140 is less than the rate at which the sort 204 and merge and count 208 processes within system 200 read and write cache data.

For clarity of explanation, the example illustrated in FIGS. 2 and 3a comprises a single instance of the reference count mechanism (i.e., a single sort 204a, a single block 206a, and a single count and merge 208). However, multiple instances of each respective sort 204, block 206, and count and merge 208 (not shown) may be implemented at each sort step 204 of the reference count regeneration process implemented in connection with the present invention. For the first pass of the sort process (e.g., the sort 204a), the VTT 202 may be divided up with a section (or sub block) (not shown) assigned to each instance of the sort 204a and the block 206a. Each instance of the sort 204a may sort a respective section (i.e., a unique portion of the elements) of the VTT 202, producing 64 lists 230 as in the single instance case. Each instance of the first pass radix sort process 204a employs the same set of track number ranges to select the specific reference list 230 into which it writes a particular reference to a track number. For example, if one instance of sort process 204a compares bits 31 through 26 of the track number values to determine the specific one of the 64 reference lists 230 into which to write the track number, all instances of sort process 204a compare bits 31 through 26 of the track number values to select the appropriate reference list 230. Each instance of the sort 204a process reads a section of the VTT 202 and produces a block 206a containing a respective section (not shown) of reference list 230a, a respective section of reference list 230b and so on. The sort operations performed by the sorts 204 (e.g., the sorts 204a, 204b, etc.) may be performed serially or in parallel.

At the second pass of sorting (e.g., the sort 204b), the lists 230 from all the instances 206a are generally processed for each contiguous 67,108,864 (64M) block in the lists 206a via a respective process 204b. For example, one instance of sort process 204b may process reference list 230a from each of the blocks 206a generated by each of the instances of sort process 204a. While the number of the lists 230 is multiplied by the number of instances corresponding to the number of the blocks 206a, the total number of accesses to cache and the total size of the lists 230 generally remains the same.

When the combined sizes of the instances of a particular reference list 230 (e.g., the reference list 230a), is much larger (i.e., greater than a predetermined amount) than the average size of all of the reference lists 230a–230m, the instances of reference list 230a may be advantageously divided into sections (or sub blocks) (not shown) that may be processed by multiple instances of the second sort process 204b. Dividing (or sectioning) the reference lists 230 may provide for the references to the 64 M entry subset of the TNT 210 that are described by the entries in the reference list 230a to be processed by more than one instance of the sort process 204b.

The substantially simultaneous processing of references may be implemented to reduce the overall time during which the references are sorted, alternatively, the substantially simultaneous sorting of references may be implemented to reduce the amount of cache access traffic over interconnect fabric 126. Similarly, when the combined sizes of a particular reference list 240, for example 240a, in all of the blocks 206b are much larger (i.e., greater than a predetermined amount) than the average size of all of the reference lists 240a–240q, the references within the instances of the reference list 240a may be divided into sections, and each section may be assigned to a corresponding (or respective) instance of the sort process 204c.

When multiple instances of the count and merge process 208 are implemented, a single reference list 250 may be advantageously divided into portions where each portion is assigned to a separate instance of the count and merge process 208. Furthermore, when the instances of a particular reference list 240, for example 240a, are processed by separate instances of the sort process 204c, multiple instances of the reference list 250 may be generated. For example, multiple instances of the reference list 250a may be generated. The instances of the reference list 250a may be advantageously divided into sections where each section is assigned to a corresponding instance of the count and merge process 208.

Typically, the number of references to a 16,384 entry subset of the TNT 210 is approximately 16,384. However, in unusual circumstances, a single reference list 250 may be generated. For example the reference list 250a may contain many millions (i.e., greater than a first predetermined number) of references to a 16,384 entry subset of TNT 210 while other lists (e.g., the list 250r), may contain very few (i.e., less than a second predetermined number that is generally a lower number than the first predetermined number) references to respective subsets of the TNT 210. In an extreme case, all entries in the VTT 202 may reference entries in a single 16,384 entry subset of TNT 210. In the extreme case described above, employing a single instance of the count and merge process 208 to process the entries in the only non-empty reference list 250 may leave the other instances of the count and merge process 208 idle. In the example of a single process 208 processing a relatively large reference list 250, the combine counts 221 process (described below in connection with FIG. 3b) may be implemented so that multiple instances of the count 220 process may operate in parallel on a single, large reference list 250.

When the track numbers are distributed substantially uniformly throughout the VTT 202, the combine counts process 221 may be eliminated and the count process 220 may be followed directly by the merge process 222.

Referring to FIG. 3b, a diagram illustrating the combine counts process 221 in connection with a process 208' is shown. The process 208' may be implemented similarly to the process 208. The process 208' generally comprises the combine counts process (i.e., step, routine, operation, etc.) 221. The combine counts process 221 may be advantageously implemented when a single reference list 250 is much larger (i.e., greater than a predetermined number) than the average lengths of all of the reference lists 250 (e.g., the reference lists 250a–250r). The combine counts process 221 may be implemented similarly to the count process 220. In one example, the combine counts process 221 may generate 16,384 reference count values identifying the numbers of references to a contiguous block of 16,384 track numbers.

For example, when all entries in the VTT 202 refer to a single entry in the TNT 210 (e.g., the entry selected by the track number 42) and the third sort process (e.g., the sort 204c) is completed, the reference list 250a generally contains all of the references in the VTT 202 (i.e., the track number 42 may be within the range of track numbers 0 through 16,384). All of the other reference lists 250b–250r may be empty. Implementation of a single instance of the count 220 process to count references within the reference list 250a may generate a single instance of the count and merge process 208 of FIG. 3a. The single instance of the count and merge process 208 may process a reference list containing one reference for each valid entry in the VTT 202 which may be a time intensive process. The combine counts process 221 is generally implemented when multiple instances of a count process are beneficial.

Multiple instances of the merge and count process 208' may be advantageously implemented via dividing the reference list 250a into sections (or sub blocks) (not shown), where each section may be assigned to a corresponding instance of the count and merge process 208'. When an instance of the count process 220 completes counting the references in the corresponding section of the reference list 250a, the resulting 16,384 count values generally all reside in embedded memory (described in more detail in connection with FIG. 4). The combine counts process 221 generally transfers the 16,384 count values out of the embedded memory. The 16,384 count values may form a partial reference count list that may be written into a region of memory that is generally allocated for holding the accumulated count values (not shown). In a preferred embodiment, the combine counts process 221 may be implemented as a sequence of instructions that execute on respective ones of the processors 110 and respective predetermined memory regions holding the accumulated count values may be located within the respective processor memory 112. In another example (not shown) the accumulated count values may be stored in cache memory.

As each of the instances of the count process 220 (e.g., count processes 220a–220n) completes counting references in the respective sections of the reference list 250a, the combine counts process 221 generally adds the count values generated by the completed count process 220 to the previously accumulated count values. When all of the instances of the count process 220 have completed and the combine counts process 221 has finished accumulating the count values generated by the instances of the count process 220 that have processed the portions that form the reference list 250a, the combine counts process 221 generally transfers the accumulated counters to a single instance of the merge process 222 that stores the count values in the embedded memory.

The combine counts process 221 generally stores the same count values that the count process 220 would have generated had a single instance of count process 220 been implemented to read the entire reference list 250a into the embedded memory implemented by the selected instance of the merge process 222. The count values generated via the combine counts process 221 may identify the total number of references to the subset of the TNT 210 corresponding to the reference list 250a. The merge process 222 generally performs as described above in connection with FIG. 3a.

Figure 4:
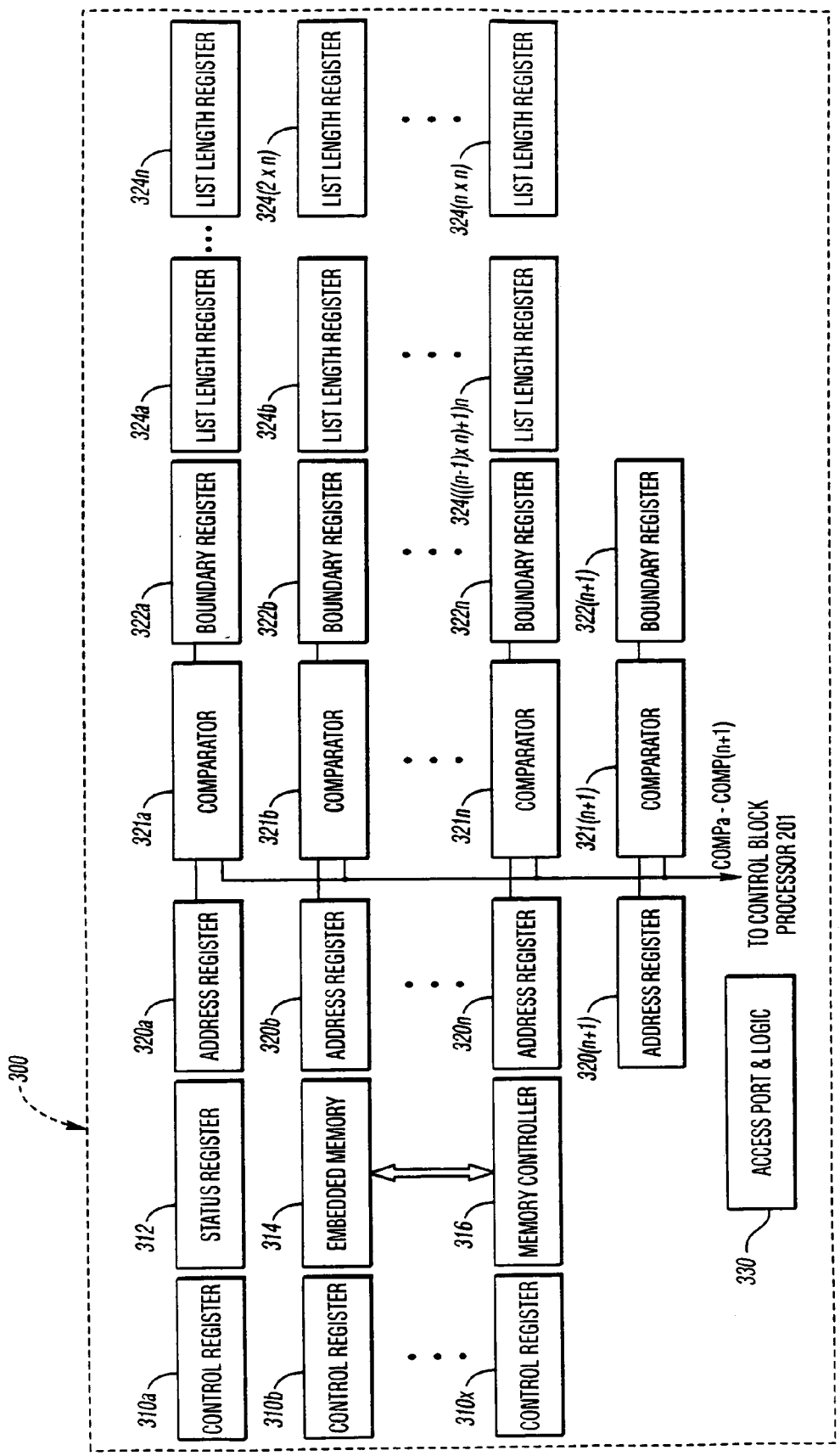
FIG. 4 is a diagram of a control block of the reference count regeneration system of FIG. 2.

Referring to FIG. 4, a diagram illustrating a control block (or controller) 300 in accordance with the present invention is shown. The controller 300 may be implemented as a reference count regeneration controller. The reference count regeneration mechanism 200 is generally located at nodes in the interconnect fabric 126 such that each instance of the system 200 can access the entire cache. Each individual instance of the system 200 generally includes a controller 300 that comprises at least one control register 310 (e.g., control registers 310a–310x), a status register 312, an embedded memory 314, a memory controller 316 coupled to the memory 314, at least one address register 320 (e.g., address registers 320a–320(n+1)), at least one comparator 321 (e.g., comparators 321a–321(n+1)), at least one boundary register 322 (e.g., boundary registers 322a–322(n+1)), at least one list length register 324 (e.g., list length registers 324a–324(n*n)), and an access port and associated logic 330. The comparators 321 are generally coupled between the respective address registers 320 and the respective boundary registers 322.

The controller 300 generally implements control of the reference count regeneration operations of the present invention (i.e., sort 204, count 220, combine counts 221, merge 222, and the like) via the at least one control register 310. Each operation (e.g., the sort 204, the count and merge 208, etc.) is generally set up and initiated by program instructions executed by at least one processor 110 via the control registers 310. Completion of a process may be indicated by an interrupt. Status of a process may be updated in the status (and error) register 312. The control registers 310 may be implemented to specify the operation (e.g., store appropriate commands, store command locations, etc.) performed via the control block 200. When the appropriate operation is a sort 204, the control registers 310 may be implemented to specify a starting bit number (not shown) and a length of a field (not shown) related to the sort 204, to specify a starting bit number (not shown) and a length of a field (not shown) related to the counting of list lengths (e.g., the list lengths 232, 242, etc.), and to specify whether the input list originates from the VTT 202 or, alternatively, a reference list (e.g., a list 230, 240, etc.).

When the operation performed in connection with the controller 300 is a count 220, the control registers 310 may be implemented to specify the starting bit number and the length of the field that selects the reference counter to be incremented. When the operation performed in connection with the controller 300 is a combine counts 221, the control registers 310 may be implemented to specify operations on values, that is, values buffered in connection with the reading of the count values from embedded memory 314 or, alternatively, the writing of the count values into embedded memory 314. When the operation is a merge 222, the control registers 310 may be implemented to specify the size of a TNT entry and the starting bit number and the length of the reference count field within a TNT entry.

The status register 312 may be configured to indicate status (e.g., successful completion, stall, etc.) of the routines such as the sort 204 and the count and merge 208, a list (e.g., a list 230, 240, etc.) full condition, an error condition such as a cache access failure, and the like. The embedded memory 314 may be configured to perform at least one buffer operation in connection with the at least one process of the present invention (e.g., the sort 204, the count 220, etc.). The embedded memory 314 may perform double-word reads and writes at approximately the interconnect fabric 126 data rate. In one example, a 16 k×32 memory may be implemented via embedded blocks in a large field programmable gate array (FPGA). Examples of suitable FPGAs may include Xilinx® Virtex™-II and Altera® Apex™-II FPGAs. However, the embedded memory 314 may be implemented having any appropriate size and via any appropriate memory hardware to meet the design criteria of a particular application.

The memory controller 316 is generally configured to control the embedded memory 314. The memory 314 may be configured either as a single read/write block or as n individual data buffers (not shown). When the buffers that are implemented in connection with the memory 314 are 1024 bytes in size, the example 16 k×32 memory described above may implement n equal to 64 for the sort 204 operation.

The count process 220 generally receives the at least one list 250 in the at least one block 206 generated by the sort routine 204 and determines (i.e., counts, tabulates, calculates, etc.) all of the references that correspond to a subset of the TNT 210. At the completion of the count operation 220, the reference count values determined by the count operation 220 are stored in embedded memory 314. In a preferred embodiment, the number of bits of embedded hardware memory allocated to each reference counter may be sufficient for the reference counter to hold a value that is at least as large as the maximum number of references to a single TNT entry that occur during a normal operation of the data storage system 100. The memory is generally sufficiently large to prevent the count process 220 from encountering reference counter overflows. In a typical example, 32 bits of embedded memory may be sufficient for each reference counter. The example implementation of 16 k×32 memory may be sufficient for the 32-bit long reference counters implemented in connection with the count operation 220 in the example illustrated in FIG. 3a. However, the embedded memory may be implemented as any appropriate size to meet the design criteria of a particular application.

The n+1 address registers 320a–320(n+1) may be configured as cache address pointers. The pointers 320a–320n may correspond (or relate) to the sort 204 output list pointers (i.e., block 206 pointers, list 230 and list 240 pointers, etc.). The remaining pointer (i.e., pointer 320(n+1)) may correspond to the VTT 202 input list during the first sort process 204a and may correspond to the reference list 230, 240, etc. input list during the subsequent sort processes (e.g., the sorts 240b–204n). The count 208 routine generally only implements one pointer 320 that may be configured as an input list pointer that relates to the block 206n. The merge routine 222 generally implements three pointers 320 (i.e., an input pointer that points to the TNT 210, an output pointer that points to the TNT 210 and a pointer to the reference count mis-compare list 212). The address registers 320 may be incremented by the control block processor 201. The address registers 320 may be read and written by the respective processor 110.

The boundary registers 322a–322(n+1) may be configured as cache address pointers. The pointers 322a–322n may correspond (or relate) to the respective boundaries of assigned memory regions related to the lists 230, 240, 250, etc. The values (e.g., entries) stored in the boundary registers 322a–322(n+1) each may be compared to a respective one of the values (e.g., entries) stored in the address registers 320a–320(n+1) via the respective comparator 321. The comparison is generally performed after every increment of an address register 320 to determine when the address has reached a boundary. When the comparator 321 determines that an address register has reached the corresponding boundary the comparator 321 generally presents at least one signal (e.g., COMPa–COMP(n+1)). The signal COMP generally indicates that an output list has filled the region of memory that has been allocated for the list, or, alternatively, that the respective operation has reached the end of the input list and the operation has completed. The results of all comparisons performed by the sort 204 and count and merge 208 operations (e.g., the respective signals COMP) are generally presented to the control block processor 201. Alternatively, the boundary registers 322a–322(n+1) may be read and written by the processor 110.

The n*n list length registers 324a–324(n*n) hold (i.e., store, contain, etc.) the list length values 232a–232m, 242a–242q, etc. generated by the sort processes 204a–204n. The list length registers 324a–324(n*n) may be read by the processor 110. The fabric access port and associated logic 330 generally interfaces with (e.g., is coupled to) the interconnect fabric 126 and may be configured to provide block reads and writes to the disk cache 128.

In one example mode of operation, the program instructions executed by processor 110 in connection with the present invention, hereinafter referred to as the functional code, may provide instructions to the processor 110 for indirectly accessing the mapping tables (i.e., the VTT 202 and the TNT 210), the intermediate reference lists (i.e., the lists 230, 240, etc. that comprise the blocks 206) or the counts generated during the count process 220. In another example mode of operation (e.g., during the combine counts process 221), the processor 110 program instructions may instruct the processor 110 to directly access the generated counts.

The functional code may dynamically execute the processes implemented in connection with the present invention (e.g., the sorts 204, count and merge 208, etc.). The functional code may determine which subsequent combination of the basic operations (e.g., the sorts 204, count 220, combine counts 221 or merge 222, etc.) are to be implemented, generally in response to the size of the lists (or subsets, sections sub blocks, etc.) 230 generated by the initial sort 204a. The functional code may determine how many instances of hardware mechanism 200 to employ in a particular application such that the reference count regeneration completion time is minimized.

The functional code may set up the command, address, and boundary registers (i.e., the registers 310, 320 and 322, respectively) for each operation. The functional code may check status via the register 312 upon completion of any of the processes (e.g., the sort 204, count 220, etc.) executed (or performed) in connection with the present invention.

The functional code may manage the space allocated to the lists 230, 240, etc. that comprise the blocks 206a–206n. In one example mode of operation, when a sort 204 terminates prematurely (i.e., prior to completion of the reference count regeneration for the respective data file) because one of the reference lists (i.e., a list 230, 240, etc.) has occupied all available space, the functional code generally retains the location of the filled list region, allocates a new region, reloads the corresponding address register 320 and boundary register 322, and provides the hardware (e.g., the controller 300) an indication that the sort 204 may continue. In another example mode of operation, when a sort operation 204, (e.g., the sort operation 204b) completes, the functional code may read the list length registers 324a–324(n*n) and allocate memory regions for the next sort operation (e.g., the sort operation 204c) that are generally appropriately sized to hold reference lists of the lengths specified by the values in the list length registers 324. The allocated memory region may be large enough to ensure that the subsequent sort operation (e.g., the sort operation 204c) will not terminate due to insufficient space for one of the reference lists (e.g., a particular reference list 250).

The functional code may manage recovery when an error occurs. In one example, (e.g., for the sort 204 and the count 220 operations), a retry routine may be implemented when an error occurs. In another example, when the functional code selects separate, non-overlapping regions of the TNT 210 for the input and output regions during the merge process 222, a retry routine may be implemented in connection with the merge process 222.

The hardware, firmware, and software implemented in connection with the present invention and the related fabric may be implemented either on a system processor card (e.g., the system controller 102), a system disk data cache memory card (e.g. the cache 128) or a combination of both. In one example, the hardware reference count regeneration may be implemented in the memory card 128 by adding a register access mechanism to the fabric 126 (e.g., via coupling to the access port and logic 330) such that the processor 110 can communicate directly with the reference count regeneration system 200, implementing appropriate changes to both processor 110 and memory 112 sides of the fabric 126, and reworking memory port circuitry, firmware and/or software such that memory access operations may be presented to other memory ports. In another example, the reference count regeneration hardware associated with the present invention may all be implemented on the processor 110 card.

Efficiency of the reference count regeneration of the present invention may depend on the size, bandwidth, and access time of the embedded random access memory (RAM) (e.g., the memory 314). The size limitation of the memory 314 may determine the size of the key field (not shown) that may be sorted and counted (e.g., via the processes 204 and 208). Access time may limit the speed of the count process 220. Since a read/increment/write operation is generally performed for each count, RAM dedicated to counter blocks such as the registers 320 may be located on-chip with the rest of the mechanism of system 200 such that operation speed is optimized (or maximized).

Buffer memory (not shown) implemented in connection with the sort 204 operation may be implemented having a high bandwidth. The buffer memory may be implemented as off-chip high speed static random access memory (SRAM). Logic implemented as the control registers 310, the status register 312, the block of address/boundary registers 320/322, the comparator 321, and the block of list length registers 324 may be implemented in memory (e.g., via a FPGA). Logic may be implemented on-chip for a barrel shifter/masker (not shown) for radix selection and control.

Chip area devoted to gates implemented in connection with the present invention is generally small when compared to the chip area devoted to memory. When board area, cost, and FPGA pin count are sufficient for off-chip memory to be implemented, the buffer space implemented in connection with the sort 204 may be expanded using quad data rate (QDR) fast SRAMs (not shown).

As is readily apparent from the foregoing description, then, the present invention generally provides an improved system and an improved method for reference count regeneration that may operate at a more rapid rate than conventional reference count regeneration systems and methods. In one example, the system and method of the present invention may be advantageously implemented in connection with the methods and apparatus of the data storage subsystem disclosed in U.S. Pat. No. 6,038,639 issued to John T. O'Brien, et al., which is hereby incorporated by reference in its entirety. However, the system and method of present invention may be implemented in connection with any appropriate data storage system to meet the design criteria of a particular application.

The present invention generally implements (i.e., employs, uses, utilizes, etc.) a reference count regeneration system and process based on sorting references extracted from a VTT. In one example, the sort is a radix sort. The present invention may employ multiple radix sort processes that process multiple reference lists generated by one or more previous radix sorts. The present invention may employ multiple radix sort processes that read separate portions of the VTT. Subsequent radix sort processes may combine together the corresponding sub-lists generated by the first pass of the radix sort process. The present invention may employ multiple count processes, and merge the counts together before merging the resulting counts into the TNT.

The present invention may process list overflow from radix sort generated lists by allocation of addition at least one memory region when an overflow is encountered. The present invention may generate reference count list lengths and allocate memory based on the list length. Further, the present invention may detect mis-compares during the TNT merge and limit the number of mis-compares that are reported.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a disk-based data storage system, a controller configured to control a reference count regeneration operation, the controller comprising:
   a control register configured to set up and initiate program instructions that are executed by at least one processor;
   an address register configured as a cache address pointer and corresponding to at least one of a sort output list pointer, a virtual track table (VTT) input list pointer, a reference list pointer, a track number table (TNT) pointer, and a reference count mis-compare list pointer;
   a status register configured to indicate status of a routine controlled by the controller, wherein the routine comprises at least one of a radix sort, a reference list count, a combine counts, and a merger of the reference list count into the TNT to generate an updated TNT;
   a boundary register corresponding to a disk cache memory that is configured to store at least one of a reference list, a reference list count length, and a mis-compare list; and
   an embedded memory configured to perform at least one buffer operation in connection with the routine controlled by the controller.

2. The controller of claim 1 wherein the control register is configured to perform at least one of specifying an operation controlled by the controller, specifying a starting bit number and a length of a field related to a sort operation controlled by the controller, specifying a starting bit number and a length of a field related to a list length counting operation controlled by the controller, and to specifying whether an input list originates from the VTT or from a reference list.

3. The controller of claim 1 wherein the control register is configured to specify a starting bit number and a length of a field that selects a reference counter to be incremented when the operation controlled by the controller is a count operation.

4. The controller of claim 1 wherein the control register is configured to specify at least one of the reading of count values from the embedded memory and writing of the count values into the embedded memory when the operation controlled by the controller is a combine counts.

5. The controller of claim 1 wherein the control register is configured to specify size of a TNT entry and a starting bit number and a length of a reference count field within a TNT entry when the operation controlled by the controller is a merge.

6. The controller of claim 1 further comprising a comparator coupled between the boundary register and the address register to compare entries in the boundary register to a respective one of entries in the address register to determine when an address has reached a boundary, and when the comparator determines that the address register has reached the corresponding boundary, the comparator presents at least one signal to a control block processor, wherein the signal indicates that an output list has filled the disk cache memory that has been allocated for the output list, or, that a respective operation has reached the end of an input list and the operation has completed.

7. The controller of claim 1 further comprising a list length register configured to store a list length value that is generated by the radix sort.

8. In a disk-based data storage system, a method for reference count regeneration, the method comprising:
   setting up and initiating program instructions that are executed by at least one processor in a control register;
   providing an address register configured as a cache address pointer and corresponding to at least one of a sort output list pointer, a virtual track table (VTT) input list pointer, a reference list pointer, a track number table (TNT) pointer, and a reference count mis-compare list pointer;
   providing a status register configured to indicate status of a routine controlled by the controller, wherein the routine comprises at least one of a radix sort, a reference list count, and a merger of the reference list count into the TNT to generate an updated TNT;
   providing a boundary register corresponding to an assigned memory region that is configured to store at least one of a reference list, a reference list count length, and a mis-compare list; and
   providing an embedded memory configured to perform at least one buffer operation in connection with the routine controlled by the controller.

9. The method of claim 8 wherein the control register is configured to perform at least one of specifying an operation controlled by the controller, specifying a starting bit number and a length of a field related to a sort operation controlled by the controller, specifying a starting bit number and a length of a field related to a list length counting operation controlled by the controller, and to specifying whether an input list originates from the VTT or from a reference list.

10. The method of claim 8 wherein the control register is configured to specify a starting bit number and a length of a field that selects a reference counter to be incremented when the operation controlled by the controller is a count operation.

11. The method of claim 8 wherein the control register is configured to specify at least one of the reading of count values from the embedded memory and writing of the count values into the embedded memory when the operation controlled by the controller is a combine counts, and to specify size of a TNT entry and a starting bit number and a length of a reference count field within a TNT entry when the operation controlled by the controller is a merge.

12. The controller of claim 1 further comprising providing a comparator coupled between the boundary register and the address register to compare entries in the boundary register to a respective one of entries in the address register to determine when an address has reached a boundary, and when the comparator determines that the address register has reached the corresponding boundary, the comparator presents at least one signal to a control block processor, wherein the signal indicates that an output list has filled the disk cache memory that has been allocated for the output list, or, that a respective operation has reached the end of a input list and the operation has completed.

13. The method of claim 8 further comprising providing a list length register configured to store a list length value that is generated by the radix sort.

14. In a disk-based data storage system, a controller configured to control a reference count regeneration, the controller comprising:
a processor configured to dynamically execute functional code, wherein the functional code determines the implementation of at least one operation in response to the size of at least one list generated by an initial radix sort of a virtual track table (VTT), and the operation comprises one of a subsequent radix sort of the at least one list generated by the initial sort, a count of entries in the at least one list generated by the initial sort, and a merge of the at least one list generated by the initial sort into a track number table (TNT); and
a disk cache memory configured to hold the VTT, the TNT, and the at least one list.

15. The controller of claim 14 wherein the functional code further determines how many instances of a hardware mechanism to implement in a particular application such that the reference count regeneration completion time is minimized.

16. The controller of claim 14 wherein the functional code further sets up command registers, address registers, and boundary registers for each of the operations dynamically executed by the processor.

17. The controller of claim 14 wherein the functional code further checks status of the at least one operation via a status register.

18. The controller of claim 14 wherein, when a sort operation terminates prematurely, the functional code provides instructions to retain the location of a filled list region, allocate a new region, reload a corresponding address register and a boundary register, and provide the controller an indication that the sort operation can continue.

19. The controller of claim 14 wherein, when a sort operation completes, the functional code provides instructions to read a list length register and implement a list length value contained in the list length register, and allocate a memory region for a next sort operation, and the allocated memory region is large enough to ensure that the next sort operation will not terminate due to insufficient memory space for a reference list.

20. The controller of claim 14 wherein, when an error occurs the functional code provides instructions to manage recovery and the recovery comprises a retry routine.

* * * * *

UNITED STATES PATENT AND TRADEMARK OFFICE
CERTIFICATE OF CORRECTION

PATENT NO. : 7,130,983 B1 Page 1 of 1
APPLICATION NO. : 10/738946
DATED : October 31, 2006
INVENTOR(S) : Detar, Jr. et al.

It is certified that error appears in the above-identified patent and that said Letters Patent is hereby corrected as shown below:

Column 27, Line 5, Claim 12:

Delete "1" and insert -- 8 --.

Signed and Sealed this

Sixth Day of February, 2007

JON W. DUDAS
*Director of the United States Patent and Trademark Office*